United States Patent [19]

Nakagawa et al.

[11] Patent Number: 5,543,956
[45] Date of Patent: Aug. 6, 1996

[54] TORSIONAL VIBRATORS AND LIGHT DEFLECTORS USING THE TORSIONAL VIBRATOR

[75] Inventors: Wataru Nakagawa; Satoru Sakaue; Michihiko Tsuruoka, all of Kawasaki, Japan

[73] Assignee: Fuji Electric Co., Ltd., Kanagawa, Japan

[21] Appl. No.: 132,291

[22] Filed: Oct. 6, 1993

[30] Foreign Application Priority Data

Oct. 8, 1992 [JP] Japan .................................. 4-270543
Oct. 30, 1992 [JP] Japan .................................. 4-291839

[51] Int. Cl.⁶ .......................... G02B 7/182; G02B 26/08; B06B 1/02
[52] U.S. Cl. .......................... 359/225; 359/226; 359/872; 310/36; 73/668
[58] Field of Search .................................. 359/223, 224, 359/225, 226, 280, 846, 847, 849, 872, 298, 278; 310/36, 37, 38; 73/666, 667, 668

[56] References Cited

U.S. PATENT DOCUMENTS

| | | |
|---|---|---|
| 3,642,344 | 2/1972 | Corker . |
| 3,666,974 | 5/1972 | Dostal . |
| 3,758,199 | 9/1973 | Thaxter ................................. 359/224 |
| 4,317,611 | 3/1982 | Petersen . |
| 4,943,147 | 7/1990 | Mizuno et al. .......................... 359/225 |
| 5,245,463 | 9/1993 | Goto ....................................... 359/224 |
| 5,268,784 | 12/1993 | Chaya ..................................... 359/224 |

FOREIGN PATENT DOCUMENTS

| | | | |
|---|---|---|---|
| 664983 | 10/1938 | Germany . | |
| 3914031 | 10/1990 | Germany . | |
| 4211813 | 6/1993 | Germany . | |
| 4235593 | 10/1993 | Germany . | |
| 0107017 | 6/1985 | Japan ..................................... | 359/224 |
| 63-82165 | 4/1988 | Japan . | |
| 0195406 | 8/1989 | Japan ..................................... | 359/224 |
| 2075762 | 11/1981 | United Kingdom . | |
| 2175705 | 12/1986 | United Kingdom . | |

*Primary Examiner*—Ricky D. Shafer
*Attorney, Agent, or Firm*—Spencer & Frank

[57] ABSTRACT

A second torsional vibrator having an outer frame and a second torsional spring is formed on the outer side of a first torsional vibrator having a pair of torsional springs and a plate member (reflection mirror), with a second torsional vibrator being fixed by the fixed part. The resonant frequency for the first torsional vibrator is set higher than that for the second torsional vibrator. The outer frame in the second torsional vibrator is driven substantially at the resonant frequency of the first torsional vibrator by an electromagnetic or electrostatic force. As a result, it becomes possible to obtain a stable and large scanning angle by using only a small driving force.

11 Claims, 9 Drawing Sheets

# TORSIONAL VIBRATORS AND LIGHT DEFLECTORS USING THE TORSIONAL VIBRATOR

CROSS REFERENCE TO RELATED APPLICATIONS

The present application claims the rights of priority of Japanese Patent Application No. 270,543/1992, filed in Japan on Oct. 8, 1992, and Japanese Patent Application No. 291,839/1992, filed in Japan on Oct. 30, 1992, the subject matter of both applications being incorporated herein by reference.

BACKGROUND OF THE INVENTION

FIELD OF THE INVENTION

The present invention relates to a torsional vibrator and a light deflector using the torsional vibrator that can be applied to scanning devices in optical devices such as electrophotographic copiers, laser printer image forming device or bar code reading devices.

DESCRIPTION OF THE PRIOR ART

The prior art includes the device shown in FIGS. 1A and 1B (Refer to U.S. Pat. No. 4,317,611).

In FIG. 1A, reference numeral 51 denotes a vibrator including span bands 52a and 52b and a reflection mirror 53 which are formed integrally on a silicon plate, for example. Reference numeral 54 denotes a glass substrate. The reflection mirror 53 contacts a protrusion 55 of the substrate 54, which has its two sides separated by a gap by means of a recess 56. Reference numerals 57a and 57b are electrodes disposed on the substrate 54. Then a voltage is applied from an external source across one of the electrodes and the mirror 53, the mirror 53 is pulled by an electrostatic attraction force and is thereby slanted, while light that is directed onto the mirror 53 is scanned as indicated by the arrow in FIG. 1B. In other words, if the mirror 53 slants by $\phi$ on either side, the light is deflected by $2\phi$. Thus, the device is constructed with few parts, so that it is very compact.

However, in the device shown in FIGS. 1A and 1B, if the distance between the electrodes is increased in order to increase the mirror deflection angle (the light scanning angle), a high voltage is necessary so that the device is not practical. Therefore, the device has the drawback that a scanning angle of only one or two degrees at most can be obtained.

Accordingly, an image forming-device, as shown in FIGS. 2A and 2B, has been proposed (Japanese Patent Application Laying-open No. 62-82,165/1988). FIG. 2A is a plan view showing a light deflector 310. FIG. 2B is a perspective view of the overall structure of a light deflecting device 300. This light deflecting device 300 has a light deflector 310 consisting of a galvano mirror made up of a reflection mirror 312 and a driving coil 311. The light deflector 310 is positioned in an external magnetic field generated by a yoke 328 and a coil 329. An alternating current coinciding with the resonant frequency of the light deflector 310 flows into the coil 311 to attain a mirror displacement that is proportional to the current. This galvano mirror can easily increase the angle displacement in the reflection mirror 312 by increasing the applied current, thus allowing the light scanning angle to be increased.

However, the light deflector 310 shown in FIGS. 2A and 2B has the following problems.

(1) The driving coil 311 placed on the same substrate as the reflection mirror 312 requires a large current, which is likely to deform the mirror because of heating, thereby causing distortion of the reflected light image.

(2) It is necessary to dispose a lead made of copper or silver on the ligament 313 which functions as a torsional spring. If the ambient temperature changes, the resonant frequency and its Q changes and becomes unstable because of the difference in the linear expansion coefficients of the spring member and the lead.

SUMMARY OF THE INVENTION

Therefore, an object of the present invention is to provide a torsional vibrator and a light deflector using the torsional vibrator having a compact and inexpensive structure and performing stable operation such as light scanning.

In order to attain the object, in the present invention, a second torsional vibrator having a responsively acting part and a second torsional spring is formed on the outer side of a first torsional vibrator having a pair of torsional springs and a plate member (or a pair of torsional springs and a mirror), while the second torsional spring is fixed. Furthermore, a resonant frequency of the first torsional vibrator is set higher than that of the second torsional vibrator, and the responsively acting part in the second torsional vibrator is driven substantially at the first resonant frequency by an electromagnetic or electrostatic attraction force generating means. With such a structure, the angle amplitude at the second torsional vibrator reaches a maximum at its resonant frequency, while at a higher frequency the amplitude decreases as the driving frequency increases.

In other words, it is possible to reduce the amplitude at the second torsional vibrator and to increase the amplitude at the first torsional vibrator by driving the second torsional vibrator at the first resonant frequency.

The force applied to the responsively acting part forms a pair of forces. With such a structure, the amplitude on the side of the second torsional vibrator provided with the driving means may be small, so that the distance between the driving means and the second torsional vibrator may be set shorter, thus making it possible to obtain a large deflection angle or scanning angle with very little energy.

In addition, since a driving means that does not contact the plate member or the reflection mirror is used, no thermal distortion due to heating makes it possible to carry out stable operation, including light beam scanning.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

Figure 1A:
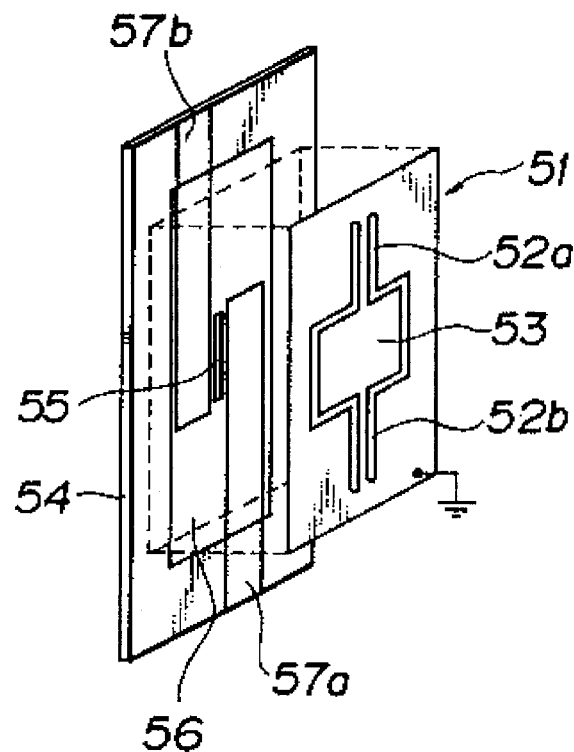
FIG. 1A is a perspective view showing an example of prior art vibrator.
Figure 1B:
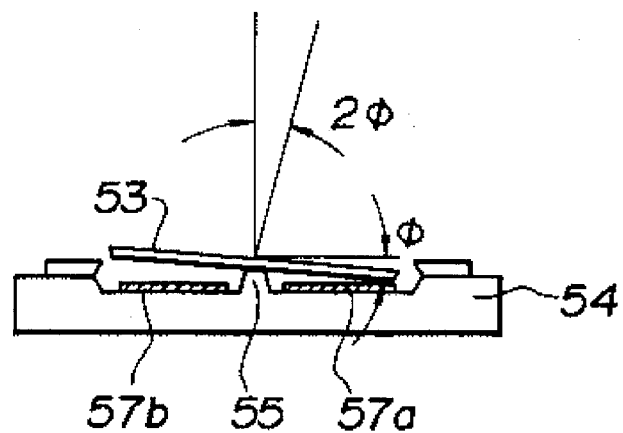
FIG. 1B is a sectional view showing the vibrator.
Figure 2B:
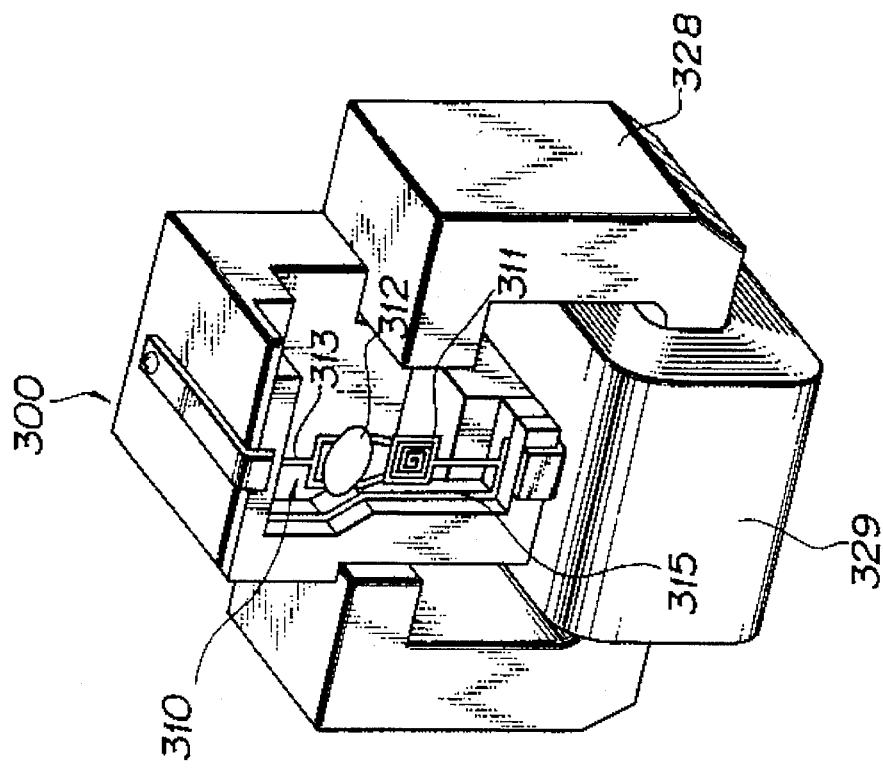
FIG. 2B is a perspective view of the overall structure of the light deflecting device.
Figure 2A:
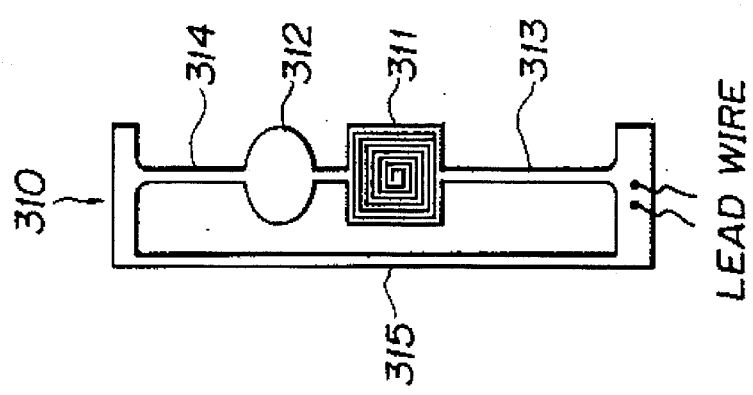
FIG. 2A is a plan view showing an example of a prior art light deflecting device.
Figure 3:
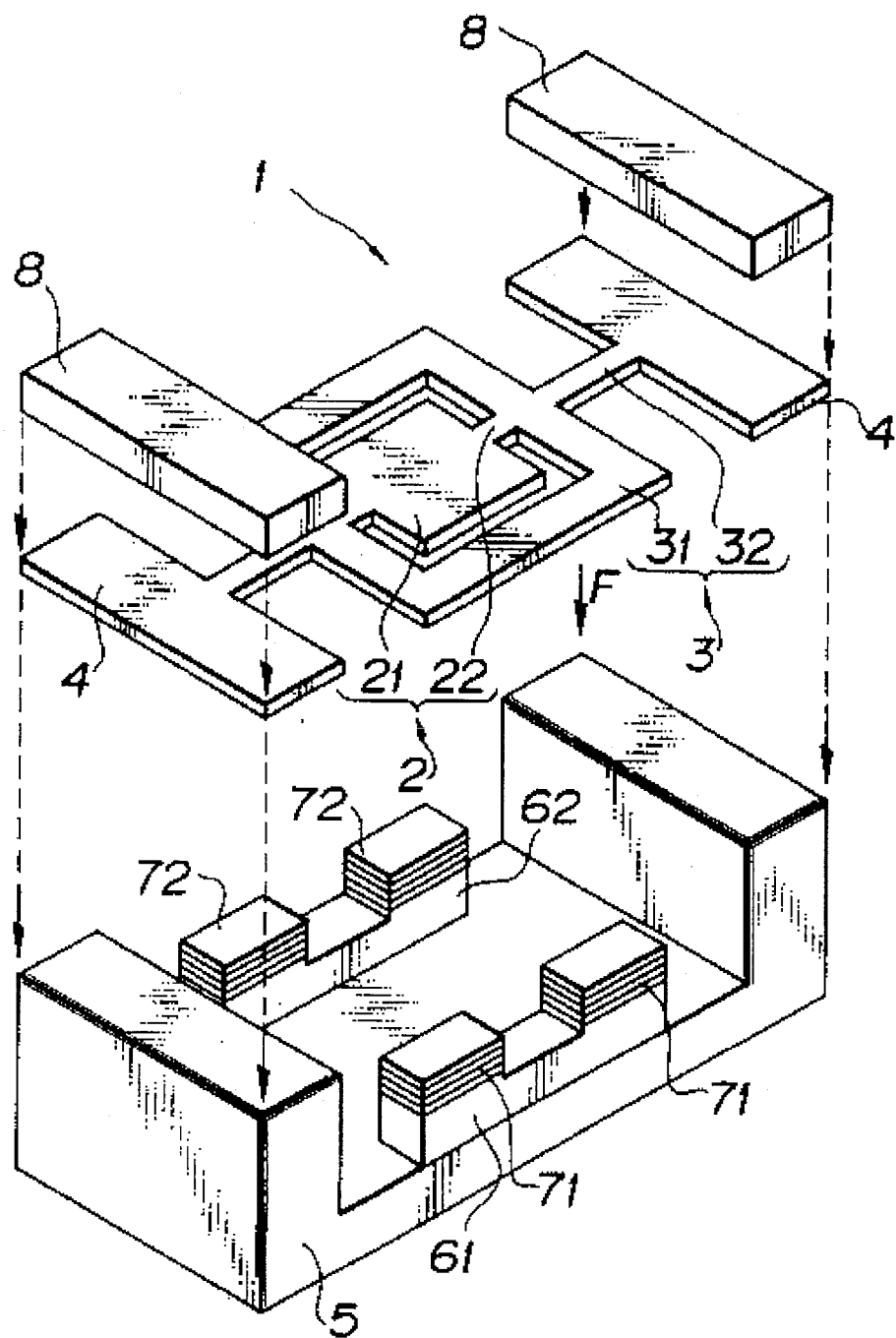
FIG. 3 is a perspective view of one embodiment of the present invention.
Figure 4:
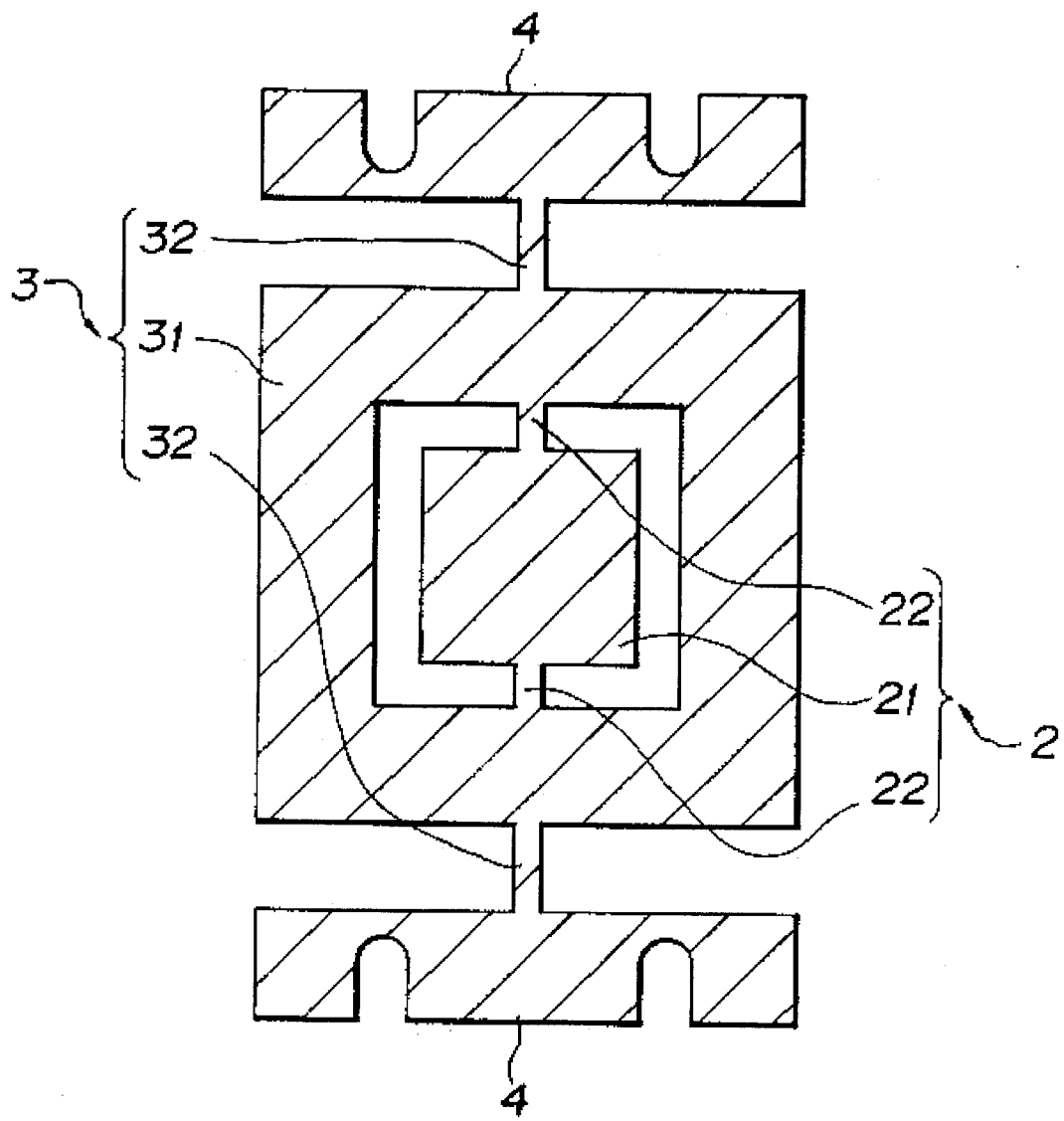
FIG. 4 is a plan view of the vibrator shown in FIG. 3.

FIG. 3 is a perspective view showing one embodiment of the present invention. FIG. 4 is a plan view showing the configuration of the vibrator in FIG. 3.

In FIGS. 3 and 4, reference numeral 1 denotes a vibrator with two degrees of freedom made of a magnetic material, having a first torsional vibrator 2 having a plate member 21 and a pair of first torsional springs 22, a second torsional vibrator 3 having an outer frame 31 and a pair of second torsional springs 32, and fixing parts 4. The first torsional springs 22 and the second torsional springs 32 are aligned along the center axis of the plate member 21.

By replacing the plate member 21 with a reflection mirror or disposing a reflection mirror on the plate-shaped member 21, a light deflecting device can be obtained. The present invention will be explained hereinafter primarily referring to examples of a light deflector.

The plate member 21 forming a reflection mirror and the outer frame 31 are so constructed to rotate around the first and second torsional springs 22 and 32. Two electromagnetic driving means, one having a first yoke 61 and a first coil 71 and the other having a second yoke 62 and a second coil 72, are arranged with a small distance between the electromagnetic driving means and the outer frame 31 in the vicinity of the outer frame 31, and on the right and left sides of the first and second torsional springs 22 and 32, respectively. Since the outer frame 31 acts in response to the driving means, it is hereinafter referred to as the responsively acting part. The fixing parts 4 are fixed firmly onto a substrate 5 by stopping plates 8.

With such a configuration, when a current is fed into the coil 71 and 72, a magnetic flux is generated from one of the coils 71 and 72 to the other of the coils 71 and 72 via the outer frame 31, so that a force is generated to pull the outer frame 31 made of a magnetic material in the vicinity of the yokes 61 and 62. Therefore, by supplying a current alternately to the coils 71 and 72, the vibrators 2 and 3 rotate around the rotating axes of the first and second torsional springs 22 and 32, respectively.

Figure 5:
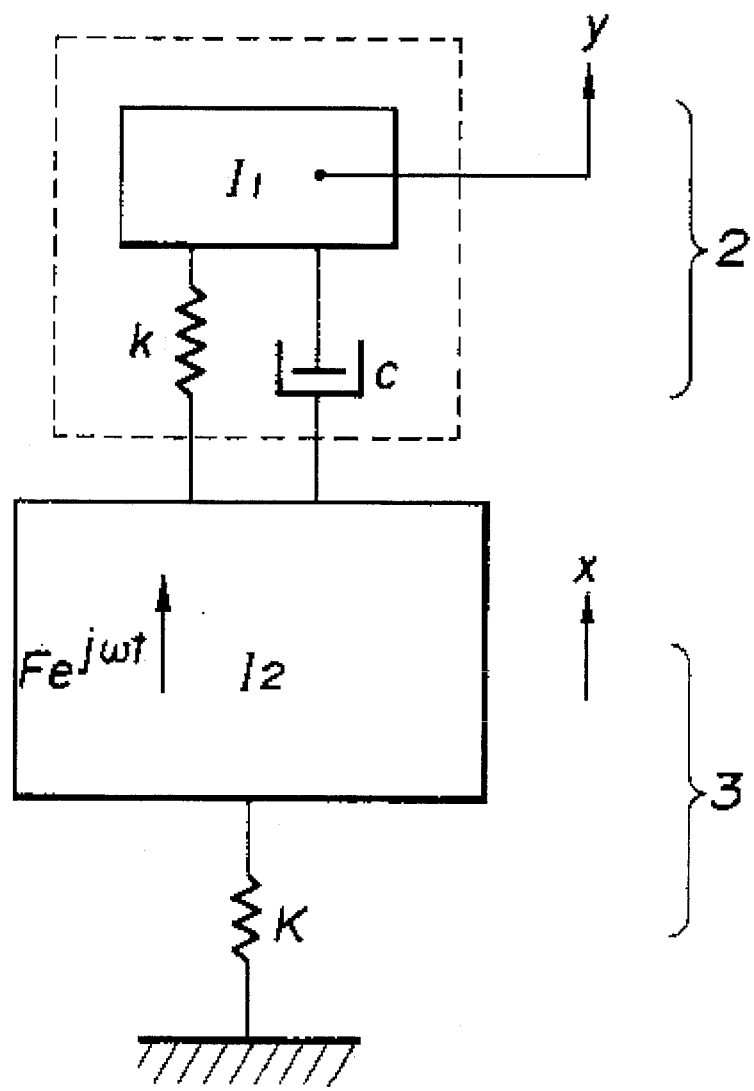
FIG. 5 is an explanatory diagram explaining the principle of the present invention.

FIG. 5 shows the principle model of this vibrator, which has two degrees of freedom, i.e., each vibrator 2, 3, has one degree of freedom due to its rotation about the rotating axes of the respective spring 22, 23.

The first torsional vibrator 2 is illustrated by a dotted line in FIG. 5, and the model has a vibrator with a moment of inertia "$I_1$", a spring with a torsional spring constant "$k$" and a attenuation with an elastic constant "$C$". The second torsional vibrator 3 is shown in the model consisting of a vibrator with a moment of inertia "$I_2$", and a spring with a torsional spring constant "$K$". Since the attenuation that affects the second torsional vibrator is so small, it is neglected here.

The amplitude "X" of the second torsional vibrator 3, to which a harmonic vibration force "$Fe^{jwt}$" is applied and the displacement of the first torsional vibrator 2 "y" are expressed by the following equations. Here, "$\omega$" is a vibration angular frequency.

$$|x|=F\cdot\{(k-I_1\omega^2)^2+(C\omega)^2\}^{1/2}/|\Delta(\omega)| \qquad (1)$$

$$y=F\cdot\{k^2-(C\omega)^2\}^{1/2}/|\Delta(\omega)| \qquad (2)$$

$$|\Delta(\omega)|=[\{(k-I_2\omega^2)(k-I_1\omega^2)-I_1k\omega^2\}^2+(C\omega)^2\{K-(I_1+I_2)\omega^2\}^2]^{1/2} \qquad (3)$$

Assuming that the attenuation that affects the first torsional vibrator is so small (like the attenuation in the second torsional vibrator) that it can be neglected, the amplitude "x" for the second torsional vibrator is give by the following equation when C=0:

$$|x|=F|k-I_1\omega^2|/|(K-I_2\omega^2)(k-I_1\omega^2)-I_1k\omega^2| \qquad (4)$$

If the second torsional vibrator is driven by the resonant frequency of the first torsional vibrator: $f=2\pi\omega=2\pi(k/I_1)^{1/2}$, then $$|x|=0.$$

On the other hand, the amplitude of the first torsional vibrator "y" is given by the following equation:

$$|y|=F|k|/|(K-I_2\omega^2)(k-I_1\omega^2)-I_1k\omega^2|=F/|k|,$$

Thus, the amplitude "y" that is proportional to the driving force F can be obtained.

In this embodiment, the resonant frequency of the first torsional vibrator 2 is set much higher than the resonant frequency of the second torsional vibrator 3. As a result, it is possible to suppress the amplitude of the second torsional vibrator 3, even if the vibrator is driven at a frequency that is slightly deviated from the resonant frequency of the first torsional vibrator 2. As a result, the amplitude of the plate member (reflection mirror) 21 may be increased, even if the distance between the second torsional vibrator 3 and the yokes 61 and 62 is small. In other words, because the gap distance is small, the driving force for the driving current can be increased, thereby ensuring a large amplitude for a large plate member (reflection mirror) with a small driving energy.

Figure 6:
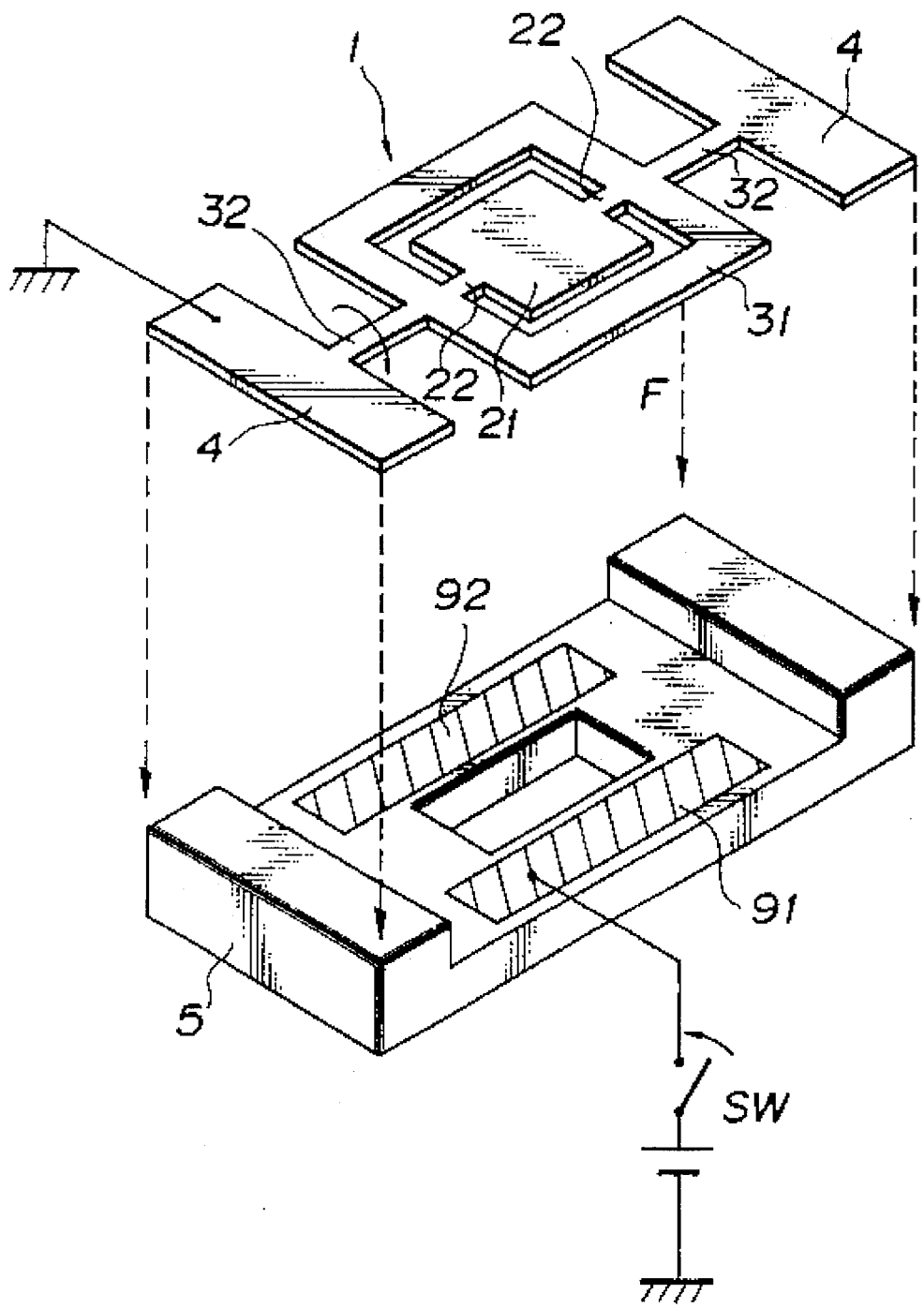
FIG. 6 is a perspective view of another embodiment of the present invention.

FIG. 6 is a perspective view showing another embodiment of the present invention.

In this embodiment, fixed electrodes 91 and 92 are arranged on opposite sides of the outer frame (the responsively acting part) 31. While the outer frame 31 is grounded via the fixed part 4, a voltage is applied alternately to the fixed electrode 91 or 92 via a switch SW, so that the electrostatic force generated between the two electrodes is utilized. In this embodiment, the vibrator, which has two degrees of freedom, is rotatingly vibrated in the same manner as the embodiment in FIG. 3 and FIG. 4 substantially at the resonant frequency of the first torsional vibrator.

The electrostatic force F can be expressed as:

$$"F"=\epsilon\cdot\epsilon_0\cdot S\cdot V/d^2,$$

where "d" is a gap distance, "S" is the electrode area, "V" is the applied voltage, "ε" is the specific dielectric constant, and "ε₀" is the dielectric constant vacuum.

This means that a very low voltage is sufficient to obtain a large force if a small gap value can be set. In other words, utilizing a torsional vibrator described above can realize a large vibration amplitude of the plate member (reflection mirror) with a low voltage. In addition, such an electrostatic driving system offers the advantage that a more compact structure is facilitated because of fewer parts than an electromagnetic driving system having a plurality of yokes and coils, since it is sufficient to simply arrange the fixed electrodes in the electrostatic driving system.

In the above embodiments, the degrees of freedom may be three or more.

Figure 7:
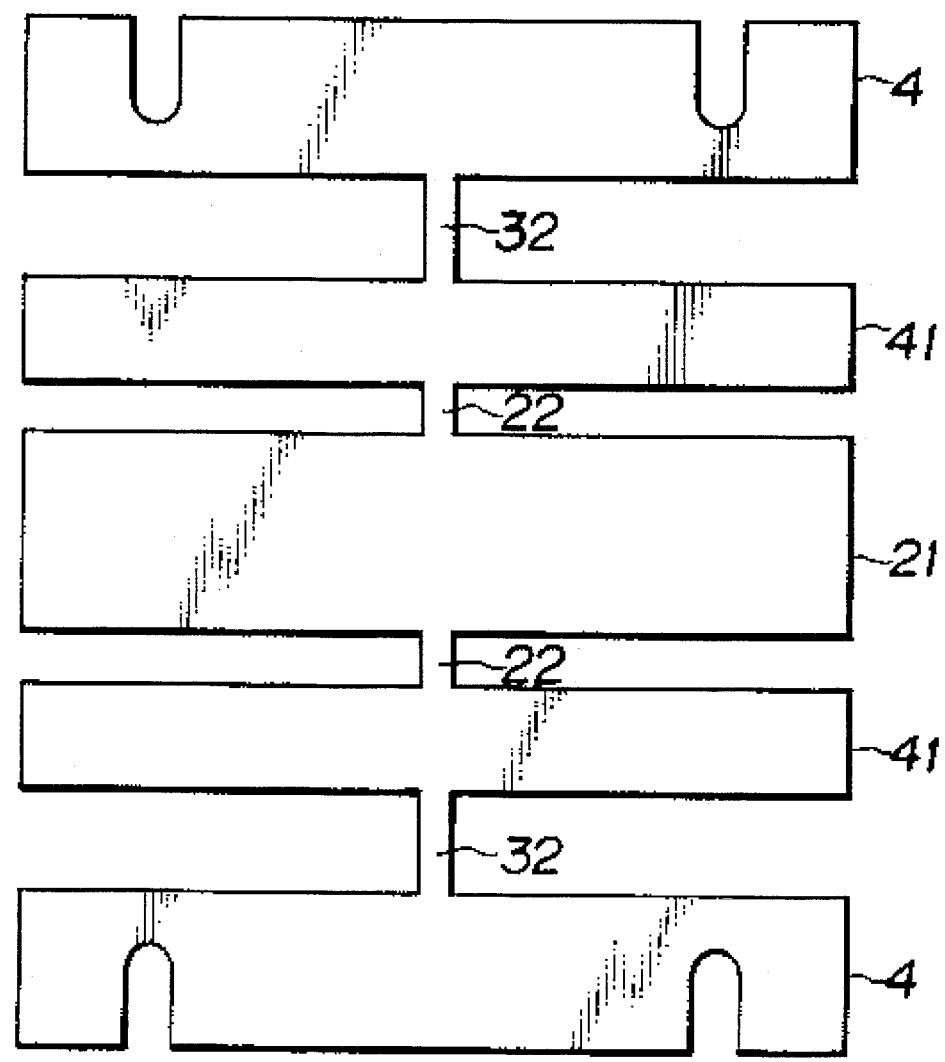
FIG. 7 is a plan view of an example of a vibrator which has three degrees of freedom.

FIG. 7 shows an embodiment of a vibrator with three degrees of freedom, i.e., this embodiment comprises three discrete elements each of which is rotatable about an axis.

In FIG. 7, reference numeral 41 denotes a responsively acting part corresponding to the outer frame 31 in FIG. 4. Since all the other parts are identical with those in FIG. 4, their explanations are omitted here. With the vibrator thus structured, it is possible to make a relatively large plate member or reflection mirror, even if the size of the outer shape is made smaller.

Further, because the embodiments shown in FIG. 3 and FIG. 6 use an unidirectional driving force, a large force applied to the vibrator may generate a bending vibration in the supporting parts, thereby causing the scanning light to wobble in directions other than the required direction. In addition, since the force is inversely proportional to the square of the set gap distance, the generation of an excessive force may cause movable parts to get stuck to the fixed part, thereby rendering them inoperable.

Figure 8:
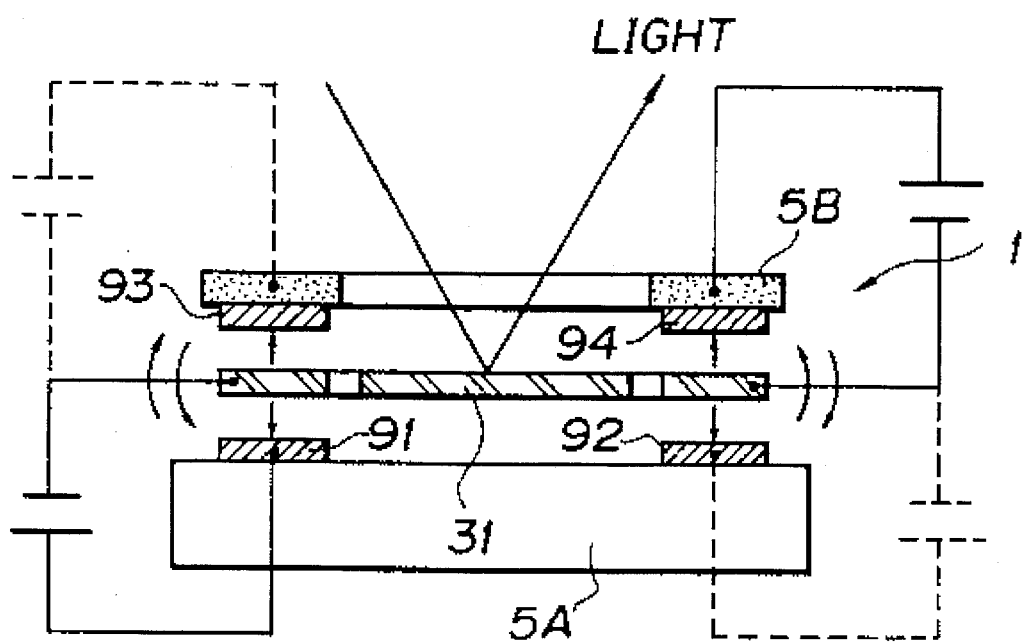
FIG. 8 is a sectional view showing one embodiment of the present invention utilizing a pair of electrostatic forces.

One embodiment, which excludes such a possibility, is shown in FIG. 8. In this embodiment, two sets of electrodes 91 and 92 and electrodes 93 and 94 are arranged in a manner that they are facing the front and rear surfaces of the outer frame 31 and are adequately spaced from the outer frame 31 (responsively acting part) in the vibrator 1 with two degrees of freedom. A voltage is applied alternately to the electrodes on the right and left sides in such a way that the voltage is applied to the electrodes on the front and rear in a reverse phase mode, so that the electrostatic force generated by this voltage application is utilized as a driving force.

Since the electrostatic force generated in this embodiment forms a pair of forces with respect to the second torsional spring in the vibrator 1 with two degrees of freedom as its center, a low voltage is sufficient to obtain the same amplitude, and no force other than the rotating force acts on the spring, thus providing a stable light scanning operation.

Figure 9A:
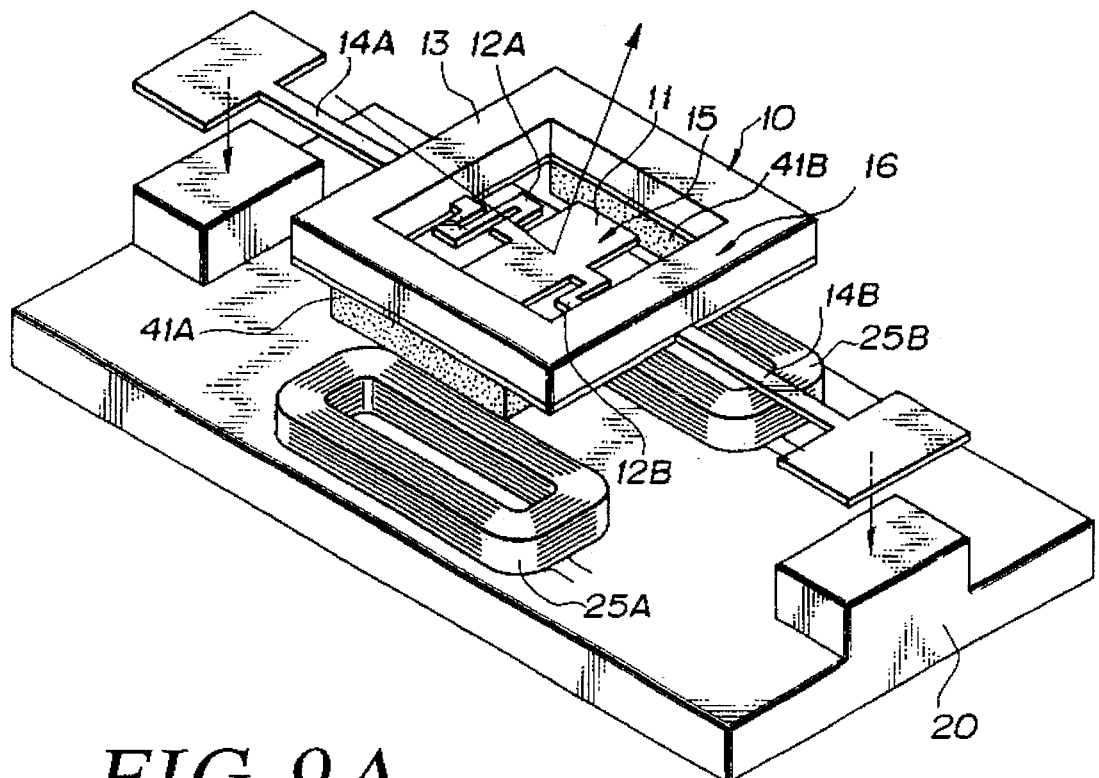
FIG. 9A is a perspective view showing one embodiment of the present invention utilizing a pair of electromagnetic forces.
Figure 9B:
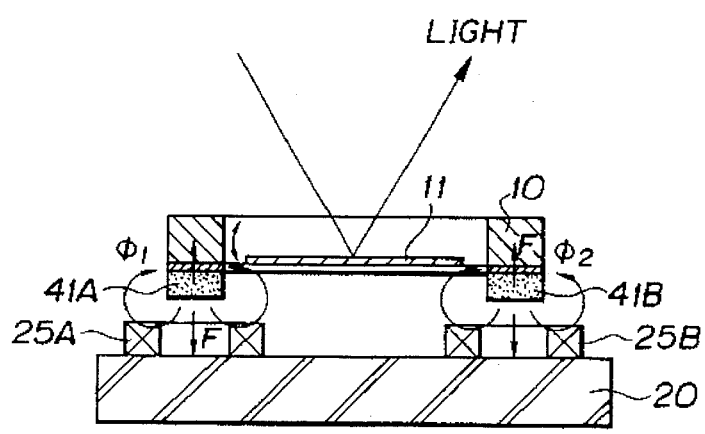
FIG. 9B is a sectional view showing the embodiment shown in FIG. 9A.

FIGS. 9A and 9B show another embodiment. FIG. 9A shows a perspective view thereof, while FIG. 9B shows its cross section. In this embodiment, a vibrator 10 with two degrees of freedom is arranged in such a manner that the first torsional vibrator 15 made of silicon, fabricated with a micromachining technique using photolithography, for example, is bonded with metallic second torsional vibrator 16. Reference numeral 11 denotes a plate member (reflection-mirror). Reference numerals 12A and 12B denote first torsional springs. Reference numeral 13 denotes an outer frame (responsively acting part). Reference numerals 14A and 14B denote; second torsional springs.

A first permanent magnet 41A and a second permanent magnet 41B are bonded to the outer frame (responsively acting part) 13 on the right and left sides thereof, a first coil 25A and a second coil 25B are fixed to a substrate 20 and arranged in the vicinity of the magnets 41A and 4B, and two currents, running in opposite directions, are fed to the coils 25A and 25B. As a result, the electromagnetic force that is generated therefrom is utilized. In this embodiment, the directions of the magnetic fluxes in the magnets 41A and 41B are set in the same direction and currents having directions opposite to each other are supplied to the coils 25A and 25B, so that the force generated becomes a pair of forces, thereby providing the same effect as in the case of FIG. 8. Even if the magnetic fields in the bonded permanent magnets are in opposite directions and the directions of the currents flowing through the coils are in the same direction, this arrangement has the same effect.

According to the present invention, a first torsional vibrator having a plate member or a reflection mirror, and a pair of first torsional springs are coupled with a second torsional vibrator having a responsively acting part and a second torsional spring to form a vibrator with two degrees of freedom, and a driving force of a pair of forces is applied to the responsively acting part of the second torsional vibrator to drive the vibrator with the resonant frequency of the first torsional vibrator, so that the amplitude of the second torsional vibrator can be made much smaller than that of the first torsional vibrator.

The driving means is required to have a small gap between the driving means and the vibrator, e.g. electromagnetic or electrostatic driving means, which generates a driving force by placing the vibrator opposite the yokes or fixed electrodes. However contrast, according to this invention, the amplitude of the plate member or the reflection mirror can be increased. Accordingly, a large scanning angle obtained in the present invention is applied to a light deflector.

In a device that uses a pair of forces, no force other than the rotating force is applied to the supporting part, so that the bending deformation in the springs is eliminated. This means that there will be little wobble in the light scanning operation, thereby realizing stable scanning.

In addition, if a magnetic material is used in the vibrators of the electromagnetic system, it is not required to from a coil and a lead on the vibrator. As a result, stable light beam scanning operation becomes possible without any heat deformation of the mirror caused by the electric current applied to the coils.

Furthermore, in the electrostatic system, it is sufficient to simply arrange fixed electrodes opposite the vibrators, so that the number of parts used can be reduced, thereby making the device more compact. Also, since in this system the vibrators can be used as long as they are made of an electrically conductive material, a wider range of material selection is possible.

The present invention has been described in detail with respect to preferred embodiments, and it will now be that changes and modifications may be made without departing from the invention in its broader aspects, and it is the intention, therefore, in the appended claims to cover all such changes and modifications as fall within the true spirit of the invention.

What is claimed is:

1. A torsional vibrator with at least two degrees of freedom, comprising:

a first vibrator having a plate member and a first torsional spring, said first vibrator having a first resonant frequency;

a second vibrator having a second resonant frequency lower than the first resonant frequency, and having a responsively acting part connected to said first vibrator, and a second torsional spring, said second torsional spring being coaxial with said first torsional spring; and, drive means for rotatingly vibrating said responsively acting part substantially at the first resonant frequency of said first vibrator.

2. A light deflector having a torsional vibrator with at least two degrees of freedom, said light deflector comprising:

a first vibrator having a light reflection mirror and a first torsional spring, said first vibrator having a first resonant frequency;

a second vibrator having a second resonant frequency lower than the first resonant frequency, and having a responsively acting part connected to said first vibrator, and a second torsional spring, said second torsional spring being coaxial with said first torsional spring; and drive means for rotatingly vibrating said responsively acting part substantially at the first resonant frequency of said first vibrator with at least one driving force.

3. A light deflector as claimed in claim 2, wherein said at least one driving force is an electromagnetic force.

4. A light deflector as claimed in claim 2, wherein said at least one driving force is an electrostatic force.

5. A light deflector having a torsional vibrator with at least two degrees of freedom, said light deflector comprising:

a first vibrator having a light reflection mirror and a first torsional spring, said first vibrator having a first resonant frequency;

a second vibrator having a second resonant frequency lower than the first resonant frequency, and having a responsively acting part connected to said first vibrator, and a second torsional spring, said second torsional spring being coaxial with said first torsional spring; and drive means for driving said responsively acting part with a pair of driving forces, said second spring as its center as a driving force, said responsively acting part being thereby rotatingly vibrated substantially at the first resonant frequency of said first vibrator.

6. A light deflector as claimed in claim 5, wherein said pair of driving forces are electromagnetic forces.

7. A light deflector as claimed in claim 5, wherein said pair of driving forces are electrostatic forces.

8. A light deflector comprising:

a torsional vibrator with at least two degrees of freedom made of magnetic material, including:
  a first vibrator having a light reflection mirror and a pair of first torsional springs, said pair of first torsional springs being formed along a center axis of said light reflection mirror, and
  a second vibrator having a responsively acting part provided on an outer side of said first vibrator and a pair of second torsional springs, said pair of second torsional springs being formed along said center axis of said light reflection mirror;

a plurality of fixing parts each attached to a respective second torsional spring;

a substrate for supporting said fixing parts of said torsional vibrator with at least two degrees of freedom; and an electromagnetic driving means for generating an electromagnetic force to rotate said responsively acting part around said center axis of said light reflection mirror, said electromagnetic driving means including first and second yokes and first and second coils arranged opposite to said responsively acting part and on opposite sides of said center axis of said light reflection mirror, said responsively acting part being rotatingly vibrated by said electromagnetic driving means substantially at a resonant frequency of said first vibrator.

9. A light defelctor comprising:

a torsional vibrator with two degrees of freedom made of electrically conductive material, including:

a first vibrator having a light reflection mirror and a pair of first torsional springs, said pair of first torsional springs being formed along a center axis of said light reflection mirror, said first vibrator having a first resonant frequency, and a second vibrator having a second resonant frequency lower than the first resonant frequency, and having a responsively acting part provided on an outer side of said first vibrator, and a pair of second torsional springs, said pair of second torsional springs being formed along said center axis of said light reflection mirror so as to be coaxial with said pair of first torsional springs;

a substrate for supporting fixed parts of said torsional vibrator with two degrees of freedom; and an electrostatic driving means for generating an electrostatic force to rotate said responsively acting part around said center axis of said light reflection mirror, said electrostatic driving means including a pair of fixed electrodes arranged opposite to said responsively acting part and on opposite sides of said center axis of said light reflection mirror, said responsively acting part being rotatingly vibrated by said electrostatic driving means substantially at the first resonant frequency of said first vibrator.

10. A light deflector comprising:

a torsional vibrator with two degrees of freedom made of electrically conductive material, including:

a first vibrator having a light reflection mirror and a pair of first torsional springs, said pair of first torsional springs being formed along a center axis of said light reflection mirror, said first vibrator having a first resonant frequency, and a second vibrator having a second resonant frequency lower than the first resonant frequency, and having a responsively acting part provided on an outer side of said first vibrator, and a pair of second torsional springs, said pair of second torsional springs being formed along said center axis of said light reflection mirror so as to be coaxial with said pair of first torsional springs;

a substrate for supporting fixed parts of said torsional vibrator with two degrees of freedom; and an electrostatic driving means for generating a pair of electrostatic forces to rotate said responsively acting part around said center axis of said light reflection mirror, said electrostatic driving means including two pairs of fixed electrodes arranged on opposite sides of front and rear surfaces of said responsively acting part and on opposite sides of said center axis of said light reflecting mirror, said responsively acting part being provided with said pair of electrostatic forces and rotatingly vibrated by said electrostatic driving means substantially at the first resonant frequency of said first vibrator.

11. A light deflector comprising:

a torsional vibrator with two degrees of freedom, including:

a first vibrator having a light reflection mirror and a pair of first torsional springs, said pair of first torsional springs being formed along a center axis of said light reflection mirror, said first vibrator having a first resonant frequency, and a second vibrator having a second resonant frequency lower than the first resonant frequency, and having a responsively acting part provided on an outer side of said first vibrator, and a pair of second torsional springs, said pair of second torsional springs being formed along said center axis of said light reflection mirror so as to be coaxial with said pair of first torsional springs;

a substrate for supporting fixed parts of said torsional vibrator with two degrees of freedom; and an electromagnetic driving means for generating a pair of electromagnetic forces to rotate said responsively acting part around said center axis of said light reflection mirror, said electromagnetic driving means including first and second permanent magnets bonded to opposite sides of said responsively acting part, and first and second coils fixed to said substrate and arranged opposite said first and second permanent magnets, responsively, said responsively acting part being provided with said pair of electromagnetic forces and being thereby rotatingly vibrated by said electromagnetic driving means substantially at the first resonant frequency of said first vibrator.

* * * * *